United States Patent
Matsunaga et al.

(10) Patent No.: US 6,943,220 B2
(45) Date of Patent: Sep. 13, 2005

(54) RUBBER COMPOSITIONS AND THEIR USES

(75) Inventors: Shinya Matsunaga, Chiba (JP); Shuichi Nonaka, Chiba (JP); Hidenari Nakahama, Chiba (JP); Masaaki Kawasaki, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 429 days.

(21) Appl. No.: 10/103,704

(22) Filed: Mar. 25, 2002

(65) Prior Publication Data

US 2003/0045624 A1 Mar. 6, 2003

(30) Foreign Application Priority Data

Mar. 26, 2001 (JP) .......................... 2001-088108
Jul. 2, 2001 (JP) .......................... 2001-200477

(51) Int. Cl.$^7$ .................. C08C 19/00; C08C 19/20; C08K 5/04; C08K 5/09; C08K 5/34
(52) U.S. Cl. ................ 525/331.7; 525/331.8; 525/332.5; 523/212; 524/94; 524/397; 524/492
(58) Field of Search .................. 523/212; 524/492, 524/397, 94; 525/331.7, 331.8, 332.5

(56) References Cited

U.S. PATENT DOCUMENTS

| | | | |
|---|---|---|---|
| 5,037,868 A | * | 8/1991 | Saito et al. ............... 524/93 |
| 5,610,217 A | | 3/1997 | Yarnell et al. |
| 6,521,713 B2 | | 2/2003 | Wolff et al. |
| 2002/0061979 A1 | | 5/2002 | Wolff et al. |

FOREIGN PATENT DOCUMENTS

| | | |
|---|---|---|
| CN | 1139943 A | 1/1997 |
| EP | 0 314 396 | 5/1989 |
| EP | 0 621 309 A1 | 10/1994 |
| JP | 3-149243 | 6/1991 |
| JP | 4-323236 | 11/1992 |
| JP | 5-239289 | 9/1993 |
| JP | 5-311007 | 11/1993 |
| JP | 6-25484 | 2/1994 |
| JP | 6-287371 | 10/1994 |
| JP | 7-268147 | 10/1995 |
| JP | 7-268148 | 10/1995 |
| JP | 2001-26688 A | 1/2001 |
| WO | WO 96/13544 A1 | 5/1996 |
| WO | WO 01/04198 A1 | 1/2001 |

* cited by examiner

*Primary Examiner*—Tae H. Yoon
(74) *Attorney, Agent, or Firm*—Birch, Stewart, Kolasch & Birch, LLP

(57) ABSTRACT

This invention relates to a composition comprising (A) an ethylene-α-olefin having 3 to 20 carbon atoms-non-conjugated polyene copolymer, (B) a specific fine-powdered silicic acid and/or a silicate having a specific surface area of 5 to 500 m$^2$/g (BET adsorption amount: ISO 5794/1, Annex D), (C) at least one kind of α,β-unsaturated carboxylic acid metal salts, (D) an organic peroxide, further optionally (E) one antioxidant selected from sulfur-containing antioxidants, phenolic antioxidants and amine antioxidants, and/or (F) sulfur, and this invention relates to a rubber product obtainable by crosslinking the above composition.

16 Claims, No Drawings

RUBBER COMPOSITIONS AND THEIR USES

This application claims priority under 35 U.S.C. §119 of Japanese application no. 2001-088108, filed Mar. 26, 2001, of Japanese application no. 2001-200477, filed Jul. 2, 2001, the entire contents of which are hereby incorporated by reference.

BACKGROUND OF THE INVENTION

1. Field of the Invention

The present invention relates to a rubber composition containing an ethylene-α-olefin having 3 to 20 carbon atoms-non-conjugated polyene copolymer, which is excellent in dynamic characteristics, namely its having a low tan δ, as well as excellent in mechanical characteristics, heat resistance and fatigue resistance and which is suitably used for automobile tires and rubber vibration insulator materials.

2. Description of the Related Art

The diene type rubber, such as natural rubber (NR), styrene-butadiene rubber (SBR) and butadiene rubber (BR), is known as a rubber excellent in dynamic fatigue resistance and dynamic characteristics, and it is used as a raw material rubber for automobile tires and rubber vibration insulators. These days, however, the environment wherein these rubber products are used has changed greatly, and there is requested improvement for the heat resistance and weather resistance of the rubber products.

Regarding automobile tires, treads and tire side walls particularly demand weather resistance. However, there has been hitherto no such rubber that retains superior mechanical characteristics, fatigue resistance and dynamic characteristics the conventional diene type rubber provides and in addition that possesses good weather resistance.

There have heretofore been made various studies on blend type rubber compositions comprising a diene type rubber which has excellent mechanical characteristics, dynamic fatigue resistance and dynamic characteristics and an ethylene-α-olefin having 3 to 20 carbon atoms-non-conjugated polyene copolymer, such as ethylene-propylene-non-conjugated diene copolymer rubber (EPDM), which has superior heat resistance and weather resistance. However, the levels of dynamic characteristics the ethylene-α-olefin having 3 to 20 carbon atoms-non-conjugated polyene copolymer possesses and the levels of those the diene type rubber possesses are different, so that blend type rubber compositions to exhibit uniform physical properties have not been obtained up to now. The dynamic characteristics in automobile tires are related to whether the material used does not worsen fuel consumption, and an index thereof is tan δ (loss tangent), and the lower the tan δ the better the dynamic characteristics.

Meanwhile, regarding rubber vibration insulator products for automobiles, as the temperature inside engine rooms becomes more elevated, it has become difficult for such rubber vibration insulator products based on natural rubber, i.e. conventional diene type rubber, to provide practically endurable fatigue resistance.

Accordingly, emergence of a novel rubber material is desired which has excellent heat resistance and in addition which has mechanical characteristics, dynamic characteristics and fatigue resistance equal or superior to the diene type rubber.

Generally, for improving dynamic characteristics it is necessary to achieve a higher crosslinking density. However, in the prior art, when it was tried to equalize the dynamic characteristics of an ethylene-α-olefin having 3 to 20 carbon atoms-non-conjugated polyene copolymer to those of a diene type rubber such as NR, the crosslinking density became too high, with the result that mechanical characteristics, such as tensile elongation at break, deteriorated; thus it has been impossible to make the dynamic characteristics and physical properties compatible.

OBJECTS AND SUMMARY OF THE INVENTION

The present invention is directed for solving the problem as above-mentioned of the prior art. The object is to provide a rubber composition which has fatigue resistance, mechanical characteristics and dynamic characteristics equivalent to those of the diene type rubber such as natural rubber and which, in addition, has superior heat resistance and weather resistance.

The inventors studied earnestly to solve the problem above and found that, by using an ethylene-α-olefin having 3 to 20 carbon atoms-non-conjugated polyene copolymer having good heat resistance, a specific fine-powdered silicic acid and/or silicate and at least one kind of α,β-unsaturated carboxylic acid metal salts, by strengthening the interaction between the fine-powdered silicic acid and/or silicate and the polymer, i.e., the ethylene-α-olefin having 3 to 20 carbon atoms-non-conjugated polyene copolymer through the α,β-unsaturated carboxylic acid metal salt or salts, further by optionally formulating at least one kind of antioxidants selected from sulfur-containing antioxidants, phenolic antioxidants and amine (amine type) antioxidants, and/or sulfur, and by crosslinking the obtained rubber composition with an organic peroxide, it was possible to improve both the dynamic characteristics and mechanical characteristics which were related antinomically and to obtain a rubber product excellent in heat aging resistance. Thus, the present invention was accomplished.

That is, the present invention includes the following inventions.

(1) A composition comprising (A) 100 parts by weight of an ethylene-α-olefin having 3 to 20 carbon atoms-non-conjugated polyene copolymer, (B) 5 to 90 parts by weight of a fine-powdered silicic acid and/or a silicate having a specific surface area of 5 to 500 $m^2/g$ (BET adsorption amount: ISO 5794/1, Annex D), (C) 0.1 to 20 parts by weight of at least one kind of α,β-unsaturated carboxylic acid metal salts and (D) 0.1 to 15 parts by weight of an organic peroxide.

(2) A composition according to the (1) above, wherein the composition contains (E) at least one kind of antioxidants selected from sulfur-containing antioxidants, phenolic antioxidants and amine (amine type) antioxidants.

(3) A composition according to the (1) or (2) above, wherein the composition contains (F) sulfur.

(4) A composition according to any one of the (1) to (3) above, wherein (A) the ethylene-α-olefin having 3 to 20 carbon atoms-non-conjugated polyene copolymer has a Mooney viscosity ($MS_{1+4}$, 160° C.) of 30 to 100.

(5) A composition according to any one of the (1) to (4) above, wherein (C) the α,β-unsaturated carboxylic acid metal salt or salts are at least one kind of compounds selected from acrylic acid metal salts, methacrylic acid metal salts and maleic acid metal salts.

(6) A composition according to any one of the (1) to (5) above, wherein the composition contains (G) a compound having at least one unsaturated hydrocarbon group and at least one hydrolysable silyl group and the amount thereof is less than $8 \times 10^{-6}$ mol per 1 $m^2$ surface area of (B) the fine-powdered silicic acid and/or silicate.

(7) A rubber product obtainable by crosslinking the composition according to the (1) to (6) above.

(8) A rubber product according to the (7) above which is a rubber vibration insulator.

The composition according to the present invention and the vulcanized rubber obtained therefrom will be explained concretely hereinafter.

First, explanation is made on the composition of the present invention. The composition of the present invention comprises an ethylene-α-olefin having 3 to 20 carbon atoms-non-conjugated polyene copolymer, a specific fine-powdered silicic acid and/or silicate, at least one kind of α,β-unsaturated carboxylic acid metal salts, an organic peroxide and further optionally at least one kind of antioxidants selected from sulfur-containing antioxidants, phenolic antioxidants and amine (amine type) antioxidants, and/or sulfur.

Ethylene-α-olefin having 3 to 20 Carbon Atoms-non-conjugated Polyene Copolymer

The ethylene-α-olefin having 3 to 20 carbon atoms-non-conjugated polyene copolymer used in the present invention preferably contains (a) the unit derived from ethylene and (b) the unit derived from α-olefin having 3 to 20 carbon atoms in a molar ratio of 50/50 to 90/10 [(a)/(b)] in view of obtaining a rubber composition which can provide a vulcanized rubber molding excellent in heat resistance and weather resistance. The above molar ratio [(a)/(b)] is more preferably 50/50 to 80/20.

The α-olefins in the above-mentioned ethylene-α-olefin having 3 to 20 carbon atoms-non-conjugated polyene copolymer are preferably α-olefins having 3 to 12 carbon atoms and include, concretely, propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 9-methyl-1-decene, 11-methyl-1-dodecene and 12-ethyl-1-tetradecene. These α-olefins can be used alone or in a mixture of two or more. Of these α-olefins, α-olefins having 3 to 8 carbon atoms, such as propylene, 1-butene, 4-methyl-1-pentene, 1-hexene and 1-octene, are particularly preferable.

As the non-conjugated polyenes in the ethylene-α-olefin having 3 to 20 carbon atoms-non-conjugated polyene copolymer there are concretely enumerated chain non-cojugated dienes such as 1,4-hexadiene, 1,6-octadiene, 2-methyl-1,5-hexadiene, 6-methyl-1,5-heptadiene and 7-methyl-1,6-octadiene; cyclic non-conjugated dienes such as cyclohexadiene, dicyclopentadiene, methyltetrahydroindene, 5-vinyl-2-norbornene, 5-ethylidene-2-norbornene, 5-methylene-2-norbornene, 5-isopropylidene-2-norbornene and 6-chloromethyl-5-isopropenyl-2-norbornene; and trienes such as 2,3-diisopropylidene-5-norbornene, 2-ethylidene-3-isopropylidene-5-norbornene, 2-propenyl-2,5-norbonadiene, 1,3,7-octatriene, 1,4,9-decatriene, 4,8-dimethyl-1,4,8-decatriene and 4-ethylidene-8-methyl-1,7-nonadiene. Among these, 1,4-hexadiene and cyclic non-conjugated diene, particularly 5-ethylidene-2-norbornene or 5-vinyl-2-norbornene, or 5-ethylidene-2-norbornene and 5-vinyl-2-norbornene jointly to form a desired quaternary polymer are preferably employed. In the present invention, when 5-ethylidene-2-norbornene or 5-vinyl-2-norbornene, or 5-ethylidene-2-norbornene and 5-vinyl-2-norbornene together to form a quaternary polymer are used as the non-conjugated polyene, a rubber composition or a vulcanized rubber most excellent in fatigue resistance is obtained.

The ethylene-α-olefin having 3 to 20 carbon atoms-non-conjugated polyene copolymer used in the present invention has an iodine value, an index of non-conjugated polyene content, of usually 8 to 50, preferably 8 to 30.

The ethylene-α-olefin having 3 to 20 carbon atoms-non-conjugated polyene copolymer used in the present invention has a Mooney viscosity $MS_{1+4}(160°$ C.) of usually 30 to 100, preferably 50 to 80. In the present invention, when an ethylene-α-olefin having 3 to 20 carbon atoms-non-conjugated polyene copolymer is used which has a Mooney viscosity $MS_{1+4}(160°$ C.) in the above range, a rubber composition or a vulcanized rubber is obtained which gives fatigue resistance equivalent or superior to that of the diene type rubber such as natural rubber.

In the present invention, though the above-mentioned ethylene-α-olefin having 3 to 20 carbon atoms-non-conjugated polyene copolymer can be used alone as the rubber component, other rubbers or plastics can further be formulated. For example, a blend of the above copolymer rubber and a diene type rubber can be used.

The diene type rubber is exemplified by natural rubber (NR), isoprene rubber (IR), butadiene rubber (BR), styrene-butadiene rubber (SBR), acrylonitrile-butadiene rubber (NBR) and chloroprene rubber (CR). Of these, natural rubber and isoprene rubber are preferable. The above diene type rubber can be used alone or in a combination. The plastics include, concretely, polyolefin resins such as crystalline polypropylene and poly(4-methyl-1-pentene), nylons, polyesters and polycarbonates.

When the diene type rubber is used in the present invention, the amount used is usually 20 to 50 parts by weight to 100 parts by weight of the ethylene-α-olefin having 3 to 20 carbon atoms-non-conjugated polyene copolymer.

Fine-powdered Silicic Acid and/or Silicate

The fine-powdered silicic acid and/or silicate used in the present invention has a specific surface area of 5 to 500 $m^2$/g (BET adsorption amount: ISO 5794/1, Annex D), preferably 10 to 400 $m^2$/g. As the fine-powdered silicic acid and fine-powdered silicate there are mentioned, for example, silica by dry method, silica by wet method and silica of synthetic silicate type. Examples of the silicate include magnesium silicate. In the present invention, the fine-powdered silicic acid and/or fine-powdered silicate can be used alone or in a combination thereof.

In the present invention, the fine-powdered silicic acid and/or silicate is used as the total in a ratio of 5 to 90 parts by weight, preferably 20 to 80 parts by weight to 100 parts by weight of the ethylene-α-olefin having 3 to 20 carbon atoms-non-conjugated polyene copolymer. When the composition of the present invention is used for a rubber vibration insulator product, the formulation ratios of the fine-powdered silicic acid and/or silicate are adjusted in compliance with the use and object, since there are required the dynamic characteristics which exert a vibration damping effect in accordance with the use of the rubber vibration insulator product.

α,β-Unsaturated Carboxylic Acid Metal Salt

As the α,β-unsaturated carboxylic acid metal salts used in the present invention preferably enumerated is at least one kind of compounds selected from acrylic acid metal salts, methacrylic acid metal salts and maleic acid metal salts.

As the acrylic acid metal salts, methacrylic acid metal salts and maleic acid metal salts, there are listed, for example, alkali metal salts (e.g., lithium salts, sodium salts, potassium salts), alkali earth metal salts (e.g., magnesium salts, calcium salts), heavy metal salts (e.g., zinc salts) and aluminum salts of acrylic acid, methacrylic acid and maleic acid, concretely, lithium acrylate, sodium acrylate, potassium acrylate, magnesium diacrylate, calcium diacrylate, zinc diacrylate, aluminum triacrylate, lithium methacrylate, sodium methacrylate, potassiummethacrylate, magnesiumdimethacrylate, calcium dimethacrylate, zinc dimethacrylate, aluminum trimethacrylate, lithium maleate, sodium maleate, potassium maleate, magnesium maleate, zinc maleate and aluminum maleate. As the α,β-unsaturated carboxylic acid metal salt particularly preferred is zinc dimethacrylate.

In the present invention, the α,β-unsaturated carboxylic acid metal salts are used in a ratio of 0.1 to 20 parts by weight, preferably 0.2 to 10 parts by weight to 100 parts by weight of the ethylene-α-olefin having 3 to 20 carbon atoms-non-conjugated polyene copolymer. The use of the α,β-unsaturated carboxylic acid metal salts improves the interaction between the polymer, i.e., ethylene-α-olefin having 3 to 20 carbon atoms-non-conjugated polyene copolymer, and the fine-powdered silicic acid and fine-powdered silicate, and this enables to obtain a crosslinked rubber product superior in dynamic characteristics and mechanical properties.

The α,β-unsaturated carboxylic acid metal salts can be used alone or in a combination of two or more.

Antioxidant

In case that an antioxidant is used in the present invention, there is used at least one kind selected from sulfur-containing antioxidants, phenolic antioxidants and amine antioxidants.

As the sulfur-containing antioxidants used are those which are usually employed for rubber.

As the sulfur-containing antioxidants, there can be enumerated, concretely, imidazole antioxidants such as 2-mercaptobenzimidazole, zinc salt of 2-mercaptobenzimidazole, 2-mercaptomethylbenzimidazole, zinc salt of 2-mercaptomethylbenzimidazole and zinc salt of 2-mercaptomethylimidazole; and aliphatic thioether antioxidants such as dimyristyl thiodipropionate, dilauryl thiodipropionate, distearyl thiodipropionate, ditridecyl thiodipropionate and pentaerythritol-tetrakis(β-lauryl-thiopropionate). Of these, particularly preferred are 2-mercaptobenzimidazole, zinc salt of 2-mercaptobenzimidazole, 2-mercaptomethylbenzimidazole, zinc salt of 2-mercaptomethylbenzimidazole and pentaerythritol-tetrakis(β-lauryl-thiopropionate).

As the phenolic antioxidants, there are used those that are usually employed for rubbers.

As the phenolic antioxidants, there can be enumerated, concretely, styrenated-phenol, 2,6-di-t-butylphenol, 2,6-di-t-butyl-4-methylphenol, 2,6-di-t-butyl-4-ethylphenol, 2,4,6-tri-t-butylphenol, butylhydroxyanisole, 1-hydroxy-3-methyl-4-isopropylbenzene, mono-t-butyl-p-cresol, mono-t-butyl-m-cresol, 2,4-dimethyl-6-t-butylphenol, butylated bisphenol A, 2,2'-methylene-bis(4-methyl-6-t-butylphenol), 2,2'-methylene-bis(4-ethyl-6-t-butylphenol), 2,2'-methylene-bis(4-methyl-6-t-nonylphenol), 2,2'-isobutylidene-bis(4,6-dimethylphenol), 4,4'-butylidene-bis(3-methyl-6-t-butylphenol), 4,4'-methylene-bis(2,6-di-t-butylphenol), 2,2'-thio-bis(4-methyl-6-t-butylphenol), 4,4'-thio-bis(3-methyl-6-t-butylphenol), 4,4'-thio-bis(2-methyl-6-butylphenol), 4,4'-thio-bis(6-t-butyl-3-methylphenol), bis (3-methyl-4-hydroxy-5-t-butylbenzene)sulfide, 2,2'-thio[diethyl bis3-(3,5-di-t-butyl-4-hydroxyphenyl)propionate], bis[3,3-bis(4-hydroxy-3-t-butylphenyl)lactic acid]glycol ester, bis[2-(2-hydroxy-5-methyl-3-t-butylbenzene)-4-methyl-6-t-butylphenyl]terephthalate, 1,3,5-tris(3,5-di-t-butyl-4-hydroxybenzyl)isocyanurate, N,N'-hexamethylene-bis(3,5-di-t-butyl-4-hydroxyhydrocinnamamide), n-octadecyl-3-(4-hydroxy-3,5-di-t-butylphenyl)propionate, tetrakis[methylene-3-(3,5-di-t-butyl-4-hydroxyphenyl) propionate]methane, pentaerythritol-tetrakis[3-(3,5-di-t-butyl-4-hydroxyphenyl) propionate], 1,1'-bis(4-hydroxyphenyl)cyclohexane, mono(α-methylbenzene) phenol, di(α-methylbenzyl)phenol, tri(α-methylbenzyl) phenol, 2,6-bis(2-hydroxy-3-t-butyl-5-methylbenzyl)-4-methylphenol, 3,9-bis[2-{3-(3-t-butyl-4-hydroxy-5-methylphenyl)propionyloxy}-1,1-dimethylethyl]-2,4,8,10-tetraoxaspiro[5.5]undecane, 2,5-di-t-amylhydroquinone, 2,6-di-t-butyl-α-dimethylamino-p-cresol, 2,5-di-t-butylhydroquinone, diethyl ester of 3,5-di-t-butyl-4-hydroxybenzyl phosphate, catechol and hydroquinone. As particularly preferable phenolic antioxidants, there can be mentioned 4,4'-butylidene-bis(3-methyl-6-t-butylphenol), 4,4'-methylene-bis(2,6-di-t-butylphenol), 2,2'-thio-bis(4-methyl-6-t-butylphenol), 4,4'-thio-bis(3-methyl-6-t-butylphenol), 4,4'-thio-bis(2-methyl-6-butylphenol), 4,4'-thio-bis(6-t-butyl-3-methylphenol), tetrakis[methylene-3-(3,5-di-t-butyl-4-hydroxyphenyl)propionate]methane, pentaerythritol-tetrakis[3-(3,5-di-t-butyl-4-hydroxyphenyl) propionate], 3,9-bis[2-{3-(3-t-butyl-4-hydroxy-5-methylphenyl)propionyloxy}-1,1-dimethylethyl]-2,4,8,10-tetraoxaspiro[5.5]undecane.

As the amine antioxidants, the amine antioxidants customarily employed for rubber are used.

Concrete examples of the amine antioxidants include naphthylamine antioxidants such as phenyl-α-naphthylamine and phenyl-β-naphthylamine; diphenylamine antioxidants such as p-(p-toluenesulfonylamido) diphenylamine, 4,4'-bis(α,α-dimethylbenzyl) diphenylamine, alkylated diphenylamine, octylated diphenylamine, dioctylated diphenylamine (e.g., 4,4'-dioctyldiphenylamine), high temperature reaction product of diphenylamine and acetone, low temperature reaction product of diphenylamine and acetone, low temperature reaction product of diphenylamine, aniline and acetone, and reaction product of diphenylamine and diisobutylene; and p-phenylenediamine antioxidants such as N,N'-diphenyl-p-phenylenediamine, n-isopropyl-N'-phenyl-p-phenylenediamine, N,N'-di-2-naphthyl-p-phenylenediamine, N-cyclohexyl-N'-phenyl-p-phenylenediamine, N-phenyl-N'-(3-methacryloyloxy-2-hydroxypropyl)-p-phenylenediamine, N,N'-bis(1-methylheptyl)-p-phenylenediamine, N,N'-bis(1,4-dimethypentyl)-p-phenylenediamine, N,N'-bis(1-ethyl-3-methylpentyl)p-phenylenediamine, N-(1,3-dimethylbutyl)-N'-phenyl-p-phenylenediamine, phenylhexyl-p-phenylenediamine and phenyloctyl-p-phenylenediamine. Of these, particularly preferable are 4,4'-bis (α,α-dimethylbenzyl)diphenylamine, N,N'-diphenyl-p-phenylenediamine and N,N'-di-2-naphthyl-p-phenylenediamine.

In the present invention the sulfur-containing antioxidants, phenolic antioxydants and amine antioxidants may be used alone, but it is preferable to use in a combination of two or more in view of maintaining a prolonged heat aging resistance under high temperatures.

In the present invention, the sulfur-containing antioxidant is used in a ratio of usually 0.2 to 10 parts by weight, preferably 0.2 to 8 parts by weight, more preferably 0.2 to 6 parts by weight to 100 parts by weight of the ethylene-α-olefin having 3 to 20 carbon atoms-non-conjugated polyene copolymer. When the sulfur-containing antioxidant is used in a ratio mentioned above, the heat aging resistance is improved greatly, and the crosslinking of the above-mentioned copolymer rubber is not hindered.

The phenolic antioxidant is used in a ratio of usually 0.2 to 5 parts by weight, preferably 0.5 to 4 parts by weight, more preferably 0.5 to 3 parts by weight to 100 parts by weight of the ethylene-α-olefin having 3 to 20 carbon atoms-non-conjugated polyene copolymer. When the phenolic antioxidant is used in a ratio mentioned above, the heat aging resistance is improved greatly, and moreover the crosslinking of the above-mentioned copolymer rubber is not impeded.

The amine antioxidant is used in a ratio of usually 0.05 to 5 parts by weight, preferably 0.1 to 4 parts by weight, more preferably 0.2 to 3 parts by weight to 100 parts by weight of the ethylene-α-olefin having 3 to 20 carbon atoms-non-conjugated polyene copolymer. When the amine antioxidant is used in a ratio mentioned above, the heat aging resistance is improved greatly, and moreover the crosslinking of the above-mentioned copolymer rubber is not impeded.

Sulfur

As sulfur, the conventional known sulfur that is usually used for the crosslinking of rubber can be used. Concrete examples thereof are powdered sulfur, precipitated sulfur, colloid sulfur, surface treated sulfur, insoluble sulfur and a sulfur masterbatch compound in which the sulfurs above have been dispersed beforehand in EPDM and/or inorganic filler.

Organic Peroxide

As the organic peroxide there can be used the conventional, known organic peroxide that is customarily used for crosslinking of rubber. Illustrative examples include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl 4,4-bis(tert-butylperoxy)valerate, benzoyl peroxide, p-chlorobenzoyl peroxide, 2,4-dichlorobenzoyl peroxide, tert-butyl peroxybenzoate, tert-butylperoxyisopropyl carbonate, diacetyl peroxide, lauroyl peroxide and tert-butyl cumyl peroxide.

Such organic peroxides are used in a ratio of 0.1 to 15 parts by weight to 100 parts by weight of the ethylene-α-olefin having 3 to 20 carbon atoms-non-conjugated polyene copolymer from the standpoints of prevention of adverse effect by excess decomposition product and cost, as well as attainment of objective physical properties through sufficient crosslinking.

Other Component

In the present invention, it is possible to formulate additives in the rubber composition, such as inorganic filler other than the fine-powdered silicic acid and silicate in an extent not to damage the object of the invention.

The inorganic filler other than the above fine-powdered silicic acid and silicate includes, concretely, carbon blacks such as SRF, GPF, FEF, MAF, HAF, ISAF, SAF, FT and MF, usual fine-powdered silicic acid, light calcium carbonate, heavy calcium carbonate, talc and clay. The specific surface area of such carbon blacks is preferably 5 to 200 m$^2$/g, and the specific surface area of the inorganic fillers is preferably 1 to 100 m$^2$/g.

In the composition of the present invention, the amount used of the carbon black is preferably 0.1 to 60 parts by weight to 100 parts by weight of the ethylene-α-olefin having 3 to 20 carbon atoms-non-conjugated polyene copolymer. In view of obtaining a rubber composition or vulcanized rubber excellent in dynamic characteristics and fatigue resistance, the amount used of the inorganic filler other than the fine-powdered silicic acid and silicate is preferably 0 to 100 parts by weight to 100 parts by weight of the ethylene-α-olefin having 3 to 20 carbon atoms-non-conjugated polyene copolymer. The total amount of the all inorganic filler components is usually 0.1 to 120 parts by weight, preferably 10 to 120 parts by weight, and more preferably 10 to 100 parts by weight to 100 parts by weight of the ethylene-α-olefin having 3 to 20 carbon atoms-non-conjugated polyene copolymer.

The composition of the present invention may incorporate a silane coupling agent. Of silane coupling agents, the compounds containing at least one unsaturated hydrocarbon group and at least one hydrolysable silyl group—for example, γ-methacryloyloxypropyltrimethoxysilane, vinyltrimethoxysilane, vinyl-tris(β-methoxyethoxy)silane, vinyltriethoxysilane and γ-methacryloxypropylmethyldimethoxysilane—act also as crosslinking agent, so that, in view of securing moderate crosslinking density and sufficient elongation, the amount incorporated is preferably less than $8 \times 10^{-6}$ mol, more preferably less than $8 \times 10^{-7}$ mol per 1 m$^2$ surface area of the fine-powdered silicic acid and/or silicate.

On the other hand, the silane coupling agent not having unsaturated hydrocarbon group, such as bis[3-(triethoxysilyl)propyl]tetrasulfide, does not act as crosslinking agent, and it can usually be incorporated in a ratio of less than $1 \times 10^{-3}$ mol per 1 m$^2$ surface area of the fine-powdered silicic acid and/or silicate.

In the composition of the present invention, there can be incorporated, in an extent not to damage the object of the present invention, a vulcanization accelerator which is usually used upon sulfur vulcanization of the ethylene-α-olefin having 3 to 20 carbon atoms-non-conjugated polyene copolymer. Illustrative examples of the above vulcanization accelerator are thiazole compounds such as N-cyclohexyl-2-benzothiazolesulfenamide, N-oxydiethylene-2-benzothiazolesulfenamide, N,N-diisopropyl-2-benzothiazolesulfenamide, 2-mercaptobenzothiazole, 2-(2,4-dinitrophenyl)mercaptobenzothiazole, 2-(2,6-diethyl-4-morpholinothio)benzothiazole and dibenzothiazyl disulfide; guanidine compounds such as diphenyl guanidine, triphenylguanidine, di-o-tolylguanidine, o-tolylbiguanide, diphenylguanidine phthalate; aldehyde-amine or aldehyde-ammonia compounds such as acetaldehyde-aniline reaction product, butylaldehyde-aniline reaction product, hexamethylenetetramine, acetaldehyde-ammonia reaction product; imidazoline compounds such as 2-mercaptoimidazoline; thiourea compounds such as thiocarbanilide, diethylthiourea, dibutylthiourea, trimethylthiourea, di-o-tolylthiourea; thiuram compounds such as tetramethylthiuram monosulfide, tetramethylthiuram disulfide, tetraethylthiuram disulfide, tetrabutylthiuram disulfide and pentamethylenethiuram tetrasulfide; dithiocarbamates such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium diethyldithiocarbamate; xanthates such as zinc dibutylxanthate; and other compounds such as zinc white (zinc oxide).

The above vulcanization accelerator is used in a ratio of 0 to 20 parts by weight, preferably 0 to 10 parts by weight to 100 parts by weight of the rubber component, i.e., the ethylene-α-olefin having 3 to 20 carbon atoms-non-conjugated polyene copolymer.

Manufacturing Method of Vulcanized Rubber

In order to obtain a vulcanized rubber from the composition of the present invention, as with the vulcanization of usual rubbers, an un-vulcanized compounded rubber (rubber composition) is once prepared by the method mentioned here in after and formed into an intended shape, and then vulcanization is conducted.

In manufacturing the vulcanized rubber of the present invention, according to the intended use of the vulcanized rubber and performance based thereon, proper selections are made regarding the kind and formulation amount of the rubber component, fine-powdered silicic acid and/or silicate, α,β-unsaturated carboxylic acid metal salt, sulfur-containing antioxidant, phenolic antioxidant, amine antioxidant and organic peroxide, and the softening agent as well, further regarding the kind and formulation amount of the compounds constituting the vulcanization system, such as vulcanization aids, and furthermore regarding the process for manufacturing the vulcanized rubber.

The above-mentioned softening agents may be any of those conventionally used for rubbers. Illustrative examples thereof may include petroleum softening agents, such as process oil, lubricating oil, liquid paraffin, petroleum asphalt and vaseline; coal tar softening agents, such as coal tar and coal tar pitch; fatty oil softening agents, such as castor oil, linseed oil, rape oil, soybean oil and coconut oil; tall oil; rubber substitute (factice) ; waxes, such as beeswax, carnauba wax and lanolin; fatty acids and fatty acid salts, such as ricinolic acid, palmitic acid, stearic acid, barium stearate, calcium stearate and zinc laurate; synthetic polymeric substances, such as petroleum resin, atactic polypropylene and coumarone-indene resin. These are used alone or in a combination of two or more. Among these, the petroleum softening agents, with particular preference being given to process oil, are preferably used. These softening agents can be used in a ratio of 0 to 100 parts by weight, preferably 2 to 80 parts by weight to 100 parts by weight of the ethylene-α-olefin having 3 to 20 carbon atoms-non-conjugated polyene copolymer.

The un-vulcanized compounded rubber is prepared, for example, by the following method. That is, the above-mentioned rubber component, fine-powdered silicic acid and/or silicate and further other inorganic filler and/or softening agent are kneaded with a mixer such as Bumbury's mixer at a temperature of 80 to 190° C. for 2 to 20 minutes. Then, subsequent to blending of an organic peroxide and further at least one kind of α,β-unsaturated carboxylic acid metal salts with a roll such as open-roll, the mixture is kneaded at a roll temperature of 40 to 60° C. for 3 to 30 minutes, and the kneaded mass is extruded to prepare a ribbon- or sheet-shaped compounded rubber.

The compounded rubber thus prepared is formed into an intended shape with an extruder, calendar roll or press, and heated usually at a temperature of 100 to 270° C. for usually 1 to 150 minutes simultaneously with the molding or after introducing the molded article into a vulcanizing chamber to produce a vulcanized rubber. Upon effecting such vulcanization, a mold may or may not be used. When the mold is not used, the process of the molding and vulcanization is carried out usually continuously.

The vulcanized rubber obtained from the composition of the present invention finds wide uses for various rubber products such as tires, automobile parts, industrial parts, articles for earthwork and construction, and the like.

Particularly, it can be employed suitably for the uses wherein the resistance to dynamic fatigue is demanded, uses such as tire tread, tire side wall, wiper blade and rubber vibration insulator for engine mount of automobile.

The composition of the present invention has excellent mechanical characteristics, dynamic fatigue resistance and heat aging resistance as well as excellent dynamic characteristics, and can provide a vulcanized rubber product having the above-mentioned effect.

This specification includes part or all of the contents as disclosed in the specifications of Japanese Patent Applications Nos. 2001-88108 and 2001-200477, which are the base of priority claim of the present application.

DETAILED DESCRIPTION OF THE PREFERRED EMBODIMENTS

The present invention will hereinafter be explained by way of examples, which should not be considered as limiting the present invention. The testing methods for various physical properties in Examples and Comparative examples are as described in the following.

[Iodine Value]

The iodine value of the copolymer rubber was determined by titration method.

[Mooney Viscosity]

The Mooney viscosity was measured at a measuring temperature of 160° C. with a S-type rotor, according to JIS K6300.

[Tensile Test/Hardness Test]

The tensile test was conducted under conditions of a measuring temperature of 23° C. and a tensile speed of 500 mm/min. according to JIS K6251. The strength $T_B$, elongation $E_B$ at break and hardness $H_A$ were measured.

[Heat Aging Resistance Test]

The air heat aging was conducted for 70 and 200 hours under a temperature of 150° C. according to JIS K6257. The tensile strength and elongation at break after the aging were measured. The results are shown as retention(%) of these values against original values prior to the aging.

[Compression Set Test]

The compression set test was conducted according to JIS K6262.

[Evaluation of Dynamic Characteristics (tan δ)]

The test of dynamic characteristics (dynamic viscoelasticity test) was based on JIS K6394, and tan δ was determined at frequencies of 10 Hz and 1 Hz under conditions of a measuring temperature of 25° C. and a strain ratio of 1% using a viscoelasticity testing equipment (model:RDS-II) made by Rheometrics Inc.

The ethylene-propylene-5-ethylidene-2-norbornene copolymer rubber, fine-powdered silicic acid and other ingredients used in Examples and Comparative examples were as follows.

(1) Ethylene-propylene-5-ethylidene-2-norbornene Copolymer Rubber (EPT)

TABLE 1

|  | EPT |
| --- | --- |
| Ethylene content (mole %) | 70 |
| Iodine value (ENB) | 18 |
| $MS_{1+4}$ (160° C.) | 70 |

(2) Fine-powdered Silicic Acid

TABLE 2

|  | Ultrasil 360*[1] | HDK N20P*[2] | Zeopole 8715*[3] |
|---|---|---|---|
| Specific surface area (m$^2$/g) (BET)*[4] | 50 | 200 | 163 |
| Average size of agglomerate ($\mu$m) | 4.5 | 14 | — |

*[1]made by Degussa Huels AG.
*[2]made by Wacker-Chemie
*[3]made by J. M. Huber
*[4]ISO 5794/1, Annex D (3) Antioxidant A
    2-Mercaptobenzimidazole
(4) Antioxidant B
    Pentaerythritol-tetrakis[3-(3,5-di-t-butyl-4-hydroxyphenyl)propionate]
(5) Antioxidant C
    4,4'-Bis($\alpha$,$\alpha$-dimethylbenzyl)diphenylamine

EXAMPLE 1

Hundred parts by weight of EPT shown in Table 1, 50 parts by weight of a paraffinic process oil [made by Idemitsu Kosan Co. Ltd., PW-380], 5 parts by weight of zinc white No.1, 1 part by weight of stearic acid, 5 parts by weight of MAF carbon black [made by Tokai Carbon Co. Ltd., Seast G116], 45 parts by weight of fine-powdered silicic acid (made by Degussa Huels AG., Ultrasil 360), 4 parts by weight of the antioxidant A and 2 parts by weight of the antioxidant B were kneaded using a 2.95-liter-volume Banbury mixer [Mixtron mixer, made by Kobe Steel, Ltd.].

The kneaded mass thus obtained was cooled to about 50° C. and added with 6.8 parts by weight of Kayacumyl D-40C [dicumyl peroxide diluted to 40% with calcium carbonate and the like, made by Kayaku Akzo Corp.] and 2 parts by weight of zinc dimethacrylate (ZMA). The mixture was kneaded with a 8-inch roll (temperature of fore roll and back roll:50° C.) and then partly taken out in the form of a sheet, which was pressed at 170° C. for 15 minutes to obtain a 2-mm thick vulcanized sheet. On this vulcanized sheet, evaluation of the physical properties was performed according to the methods previously mentioned. Further, under the press conditions of 170° C. and 20 minutes, there was obtained a thick molding of the vulcanized rubber to be placed for the compression set test, and the compression set test was conducted using this thick vulcanized rubber molding. The results are shown in Table 3.

COMPARATIVE EXAMPLE 1

A vulcanized rubber molding was obtained through the same formulation and molding conditions as in Example 1 except for using triallyisocyanurate (TAIC) in place of zinc dimethacrylate (ZMA), and evaluation of the physical properties was conducted. The results are shown in Table 3.

COMPARATIVE EXAMPLE 2

A vulcanized rubber molding was obtained through the same formulation and molding conditions as in Example 1 except for using trially isocyanurate (TAIC) in place of zinc dimethacrylate (ZMA) and further adding 0.5 part by weight of $\gamma$-methacryloyloxypropyltrimethoxysilane (silane coupling agent), and evaluation of the physical properties was conducted. The results are shown in Table 3.

EXAMPLE 2

A vulcanized rubber molding was obtained using the same formulation and molding conditions as in Example 1 except for changing the formulation amount of zinc dimethacrylate (ZMA) to 1 part by weight and that of the antioxidant A to 2 parts by weight, and evaluation of the physical properties was conducted. The results are shown in Table 3.

EXAMPLE 3

A vulcanized rubber molding was obtained using the same formulation and molding conditions as in Example 2 except for changing the formulation amount of Kayacumyl D-40C to 8.5 parts by weight, and evaluation of the physical properties was conducted. The results are shown in Table 3.

EXAMPLE 4

A vulcanized rubber molding was obtained using the same formulation and molding conditions as in Example 1 except for using 2 parts by weight of the antioxidant C in place of the antioxidant A, and evaluation of the physical properties was conducted. The results are shown in Table 3.

EXAMPLE 5

Hundred parts by weight of EPT shown in Table 1, 60 parts by weight of a paraffinic process oil [made by Idemitsu Kosan Co. Ltd., PW-380], 5 parts by weight of zinc white No.1, 1 part by weight of stearic acid, 5 parts by weight of MAF carbon black [made by Tokai Carbon Co. Ltd., Seast G116], 35 parts by weight of fine-powdered silicic acid (HDK N20P, made by Wacker-Chemie), 2 parts by weight of the antioxidant A and 2 parts by weight of the antioxidant B were kneaded using a 2.95-liter-volume Banbury mixer [Mixtron mixer, made by Kobe Steel, Ltd.].

The kneaded mass thus obtained was cooled to about 50° C. and added with 6.8 parts by weight of Kayacumyl D-40C [dicumyl peroxide diluted to 40% with calcium carbonate and the like, made by Kayaku Akzo Corp.] and 2 parts by weight of zinc dimethacrylate (ZMA). The mixture was kneaded with a 8-inch roll (temperature of fore roll and back roll:50° C.) and then partly taken out in the form of a sheet, which was pressed at 170° C. for 15 minutes to obtain a 2-mm thick vulcanized sheet. On this vulcanized sheet, evaluation of the physical properties was performed according to the methods previously mentioned. Further, under the press conditions of 170° C. and 20 minutes, there was obtained a thick molding of the vulcanized rubber to be placed for the compression set test, and the compression set test was conducted using this thick vulcanized rubber molding. The results are shown in Table 3.

EXAMPLE 6

A vulcanized rubber molding was obtained using the same formulation and molding conditions as in Example 5 except for changing the formulation amount of HDK N20P to 30 parts by weight, and evaluation of the physical properties was conducted. The results are shown in Table 3.

EXAMPLE 7

Hundred parts by weight of EPT shown in Table 1, 55 parts by weight of a paraffinic process oil [made by Idemitsu Kosan Co. Ltd., PW-380], 5 parts by weight of zinc white No.1, 1 part by weight of stearic acid, 5 parts by weight of MAF carbon black [made by Tokai Carbon Co. Ltd., Seast G116], 35 parts by weight of fine-powdered silicic acid (made by J. M. Huber, Zeopole 8715), 2 parts by weight of the antioxidant A and 2 parts by weight of the antioxidant B were kneaded using a 2.95-liter-volume Banbury mixer [Mixtron mixer, made by Kobe Steel, Ltd.].

The kneaded mass thus obtained was cooled to about 50° C. and added with 6.8 parts by weight of Kayacumyl D-40C [dicumyl peroxide diluted to 40% with calcium carbonate and the like, made by Kayaku Akzo Corp.] and 2 parts by weight of zinc dimethacrylate (ZMA). The mixture was kneaded with a 8-inch roll (temperature of fore roll and back roll:50° C.) and partly taken out in the form of a sheet, which was pressed at 170° C. for 15 minutes to obtain a 2-mm thick vulcanized sheet. On this vulcanized sheet, evaluation of the physical properties was performed according to the methods previously mentioned. Further, under the press conditions of 170° C. and 20 minutes, there was obtained a thick molding of the vulcanized rubber to be placed for the compression set test, and the compression set test was conducted using this thick vulcanized rubber molding. The results are shown in Table 4.

EXAMPLE 8

A vulcanized rubber molding was obtained using the same formulation and molding conditions as in Example 7 except for changing the formulation amount of Kayacumyl D-40C to 8.5 parts by weight, and evaluation of the physical properties was conducted. The results are shown in Table 4.

EXAMPLE 9

A vulcanized rubber molding was obtained using the same formulation and molding conditions as in Example 7 except for changing the formulation amount of Zeopole 8715 to 30 parts by weight, and evaluation of the physical properties was conducted. The results are shown in Table 4.

EXAMPLE 10

A vulcanized rubber molding was obtained using the same formulation and molding conditions as in Example 8 except for changing the formulation amount of Zeopole 8715 to 30 parts by weight, and evaluation of the physical properties was conducted. The results are shown in Table 4.

EXAMPLE 11

A vulcanized rubber molding was obtained using the same formulation and molding conditions as in Example 7 except for changing the formulation amount of Zeopole 8715 to 25 parts by weight, and evaluation of the physical properties was conducted. The results are shown in Table 4.

EXAMPLE 12

Hundred parts by weight of EPT shown in Table 1, 50 parts by weight of a paraffinic process oil [made by Idemitsu Kosan Co. Ltd., PW-380], 5 parts by weight of zinc white No.1, 1 part by weight of stearic acid, 5 parts by weight of MAF carbon black [made by Tokai Carbon Co. Ltd., Seast G116], 35 parts by weight of fine-powdered silicic acid (made by J. M. Huber, Zeopole 8715), 2 parts by weight of the antioxidant A and 2 parts by weight of zinc dimethacrylate (ZMA) were kneaded using a 2.95-liter-volume Banbury mixer [Mixtron mixer, made by Kobe Steel, Ltd.].

The kneaded mass thus obtained was cooled to about 50° C. and added with 6.8 parts by weight of Kayacumyl D-40C [dicumyl peroxide diluted to 40% with calcium carbonate and the like, made by Kayaku Akzo Corp.] and 0.1 part by weight of powdered sulfur. The mixture was kneaded with a 8-inch roll (temperature of fore roll and back roll:50° C.) and partly taken out in the form of a sheet, which was pressed at 170° C. for 15 minutes to obtain a 2-mm thick vulcanized sheet. On this vulcanized sheet, evaluation of the physical properties was performed according to the methods previously mentioned. Further, under the press conditions of 170° C. and 20 minutes, there was obtained a thick molding of the vulcanized rubber to be placed for the compression set test, and the compression set test was conducted using this thick vulcanized rubber molding. The results are shown in Table 4.

EXAMPLE 13

A vulcanized rubber molding was obtained using the same formulation and molding conditions as in Example 12 except for changing the formulation amount of the powdered sulfur to 0.2 part by weight, and evaluation of the physical properties was conducted. The results are shown in Table 4.

EXAMPLE 14

A vulcanized rubber molding was obtained using the same formulation and molding conditions as in Example 12 except for changing the formulation amount of the powdered sulfur to 0.3 part by weight, and evaluation of the physical properties was conducted. The results are shown in Table 4.

TABLE 3

|  | Ex. 1 | Com. ex. 1 | Com. ex. 2 | Ex. 2 | Ex. 3 | Ex. 4 | Ex. 5 | Ex. 6 |
|---|---|---|---|---|---|---|---|---|
| EPT | 100 | 100 | 100 | 100 | 100 | 100 | 100 | 100 |
| Paraffinic oil | 50 | 50 | 50 | 50 | 50 | 50 | 60 | 60 |
| Stearic acid | 1 | 1 | 1 | 1 | 1 | 1 | 1 | 1 |
| Zinc white No. 1 | 5 | 5 | 5 | 5 | 5 | 5 | 5 | 5 |
| MAF carbon black | 5 | 5 | 5 | 5 | 5 | 5 | 5 | 5 |
| ULTRASIL 360 | 45 | 45 | 45 | 45 | 45 | 45 |  |  |
| HDK N20P |  |  |  |  |  |  | 35 | 30 |
| Antioxidant A | 4 | 4 | 4 | 2 | 2 | 0 | 2 | 2 |
| Antioxidant B | 2 | 2 | 2 | 2 | 2 | 2 | 2 | 2 |
| Antioxidant C | 0 | 0 | 0 | 0 | 0 | 2 | 0 | 0 |
| Crosslinking agent (Kayacumyl D-40C) | 6.8 | 6.8 | 6.8 | 6.8 | 8.5 | 6.8 | 6.8 | 6.8 |
| ZMA | 2 | 0 | 0 | 1 | 1 | 2 | 2 | 2 |
| TAIC | 0 | 2 | 2 | 0 | 0 | 0 | 0 | 0 |
| Silane coupling agent | 0 | 0 | 0.5 | 0 | 0 | 0 | 0 | 0 |

TABLE 3-continued

|  | Ex. 1 | Com. ex. 1 | Com. ex. 2 | Ex. 2 | Ex. 3 | Ex. 4 | Ex. 5 | Ex. 6 |
|---|---|---|---|---|---|---|---|---|
| Physical properties of vulcanized rubber | | | | | | | | |
| $T_B$ (MPa) | 12.5 | 13.7 | 13.2 | 12.1 | 12.0 | 13.8 | 17.8 | 14.4 |
| $E_B$ (%) | 430 | 350 | 320 | 540 | 400 | 460 | 640 | 620 |
| $H_A$ (Shore A) | 54 | 55 | 56 | 53 | 56 | 54 | 55 | 50 |
| Heat aging resistance (150° C., 70 hrs) | | | | | | | | |
| AC ($T_B$) (%) | 33 | 30 | 28 | 25 | 35 | 32 | 19 | 17 |
| AC ($E_B$) (%) | −16 | −18 | −19 | −20 | −14 | −18 | −14 | −19 |
| Heat aging resistance (150° C., 200 hrs) | | | | | | | | |
| AC ($T_B$) (%) | 26 | 23 | 24 | 22 | 28 | 21 | 15 | 13 |
| AC ($E_B$) (%) | −21 | −24 | −27 | −29 | −20 | −29 | −19 | −20 |
| $c_s$ (150° C., 200 hrs) (%) | 28 | 27 | 25 | 29 | 24 | 30 | 28 | 30 |
| Dynamic characteristics | | | | | | | | |
| 1 Hz-tan δ | 0.047 | 0.061 | 0.064 | 0.045 | 0.033 | 0.049 | 0.042 | 0.039 |
| 10 Hz-tan δ | 0.067 | 0.073 | 0.073 | 0.066 | 0.050 | 0.068 | 0.065 | 0.055 |

Ex. = Example, Com. ex. = Comparative example

TABLE 4

|  | Ex. 7 | Ex. 8 | Ex. 9 | Ex. 10 | Ex. 11 | Ex. 12 | Ex. 13 | Ex. 14 |
|---|---|---|---|---|---|---|---|---|
| EPT | 100 | 100 | 100 | 100 | 100 | 100 | 100 | 100 |
| Paraffinic oil | 55 | 55 | 55 | 55 | 55 | 50 | 50 | 50 |
| Stearic acid | 1 | 1 | 1 | 1 | 1 | 1 | 1 | 1 |
| Zinc white No. 1 | 5 | 5 | 5 | 5 | 5 | 5 | 5 | 5 |
| MAF carbon black | 5 | 5 | 5 | 5 | 5 | 5 | 5 | 5 |
| Zeopole 8715 | 35 | 35 | 30 | 30 | 25 | 35 | 35 | 35 |
| Antioxidant A | 2 | 2 | 2 | 2 | 2 | 2 | 2 | 2 |
| Antioxidant B | 2 | 2 | 2 | 2 | 2 | 0 | 0 | 0 |
| Antioxidant C | 0 | 0 | 0 | 0 | 0 | 0 | 0 | 0 |
| Crosslinking agent (Kayacumyl D-40C) | 6.8 | 8.5 | 6.8 | 8.5 | 6.8 | 6.8 | 6.8 | 6.8 |
| ZMA | 2 | 2 | 2 | 2 | 2 | 2 | 2 | 2 |
| Powdered sulfur | | | | | | 0.1 | 0.2 | 0.3 |
| Silane coupling agent | 0 | 0 | 0 | 0 | 0 | 0 | 0 | 0 |
| Physical properties of vulcanized rubber | | | | | | | | |
| $T_B$ (MPa) | 17.0 | 13.1 | 13.2 | 10.9 | 11.3 | 19.7 | 20.0 | 22.3 |
| $E_B$ (%) | 680 | 560 | 590 | 510 | 540 | 650 | 690 | 720 |
| $H_A$ (Shore A) | 47 | 47 | 47 | 47 | 46 | 51 | 51 | 50 |
| Heat aging resistance (150° C., 70 hrs) | | | | | | | | |
| AC ($T_B$) (%) | 32 | 31 | 27 | 22 | 25 | 28 | 26 | 22 |
| AC ($E_B$) (%) | −16 | −18 | −19 | −14 | −19 | −18 | −20 | −19 |
| Heat aging resistance (150° C., 200 hrs) | | | | | | | | |
| AC ($T_B$) (%) | 26 | 23 | 24 | 23 | 20 | 26 | 23 | 20 |
| AC ($E_B$) (%) | −26 | −23 | −27 | −24 | −26 | −27 | −25 | −28 |
| $c_s$ (150° C., 200 hrs) (%) | 31 | 29 | 27 | 25 | 28 | 32 | 35 | 41 |
| Dynamic characteristics | | | | | | | | |
| 1 Hz-tan δ | 0.034 | 0.032 | 0.035 | 0.029 | 0.030 | 0.029 | 0.032 | 0.030 |
| 10 Hz-tan δ | 0.056 | 0.054 | 0.055 | 0.048 | 0.049 | 0.048 | 0.049 | 0.048 |

Ex. = Example, Com. ex. = Comparative example

All the publications, patents and patent applications cited herein are incorporated herein by reference in their entirety.

What is claimed is:

1. A composition comprising:
   (A) 100 parts by weight of an ethylene-α-olefin having 3 to 20 carbon atoms-non-conjugated polyene copolymer,
   (B) 5 to 90 parts by weight of a fine-powdered silicic acid and/or a silicate having a specific surface area of 5 to 500 m²/g (BET adsorption amount: ISO 5794/1, Annex D),
   (C) 0.1 to 20 parts by weight of at least one α,β-unsaturated carboxylic acid metal salt,
   (D) 0.1 to 15 parts by weight of an organic peroxide,
   (E) 0.2 to 10 parts by weight of at least one sulfur-containing antioxidant, and
   (E') at least one antioxidant selected from the group consisting of phenolic antioxidants and amine antioxidants.

2. The composition according to claim 1, wherein the composition further comprises:
   (F) sulfur.

3. The composition according to claim 1, wherein (A) the ethylene-α-olefin having 3 to 20 carbon atoms-non-conjugated polyene copolymer has a Mooney viscosity ($MS_{1+4}$, 160° C.) of 30 to 100.

4. The composition according to claim 1, wherein (C) the α,β-unsaturated carboxylic acid metal salt or salts are at least one compound selected from the group consisting of acrylic acid metal salts, methacrylic acid metal salts and maleic acid metal salts.

5. A composition comprising:

(A) 100 parts by weight of an ethylene-α-olefin having 3 to 20 carbon atoms-non-conjugated polyene copolymer, (B) 5 to 90 parts by weight of a fine-powdered silicic acid and/or a silicate having a specific surface area of 5 to 500 m$^2$/g (BET adsorption amount: ISO 5794/1, Annex D), (C) 0.1 to 20 parts by weight of at least one α,β-unsaturated carboxylic acid metal salt, (D) 0.1 to 15 parts by weight of an organic peroxide, (E) 0.2 to 10 parts by weight of at least one sulfur-containing antioxidant, and (G) a compound having at least one unsaturated hydrocarbon group and at least one hydrolysable silyl group, wherein the amount thereof is less than 8×10$^{-6}$ mol per 1 m$^2$ surface area of (B) the fine-powdered silicic acid and/or silicate.

6. A rubber product obtainable by crosslinking the composition according to claim 1.

7. The rubber product according to claim 6 which is a rubber vibration insulator.

8. The composition according to claim 5, wherein (A) the ethylene-α-olefin having 3 to 20 carbon atoms-non-conjugated polyene copolymer has a Mooney viscosity (MS$_{1+4}$, 160° C.) of 30 to 100.

9. The composition according to claim 5, wherein (C) the α,β-unsaturated carboxylic acid metal salt or salts are at least one compound selected from the group consisting of acrylic acid metal salts, methacrylic acid metal salts and maleic acid metal salts.

10. A rubber product obtainable by crosslinking the composition according to claim 5.

11. The rubber product according to claim 10, which is a rubber vibration insulator.

12. A composition comprising:

(A) 100 parts by weight of an ethylene-α-olefin having 3 to 20 carbon atoms-non-conjugated polyene copolymer, (B) 5 to 90 parts by weight of a fine-powdered silicic acid and/or a silicate having a specific surface area of 5 to 500 m$^2$/g (BET adsorption amount: ISO 5794/1, Annex D), (C) 0.1 to 20 parts by weight of at least one α,β-unsaturated carboxylic acid metal salt, (D) 0.1 to 15 parts by weight of an organic peroxide, (F) sulfur, and (G) a compound having at least one unsaturated hydrocarbon group and at least one hydrolysable silyl group, wherein the amount thereof is less than 8×10$^{-6}$ mol per 1 m$^2$ surface area of (B) the fine-powdered silicic acid and/or silicate.

13. The composition according to claim 12, wherein (A) the ethylene-α-olefin having 3 to 20 carbon atoms-non-conjugated polyene copolymer has a Mooney viscosity (MS$_{1+4}$, 160° C.) of 30 to 100.

14. The composition according to claim 12, wherein (C) the α,β-unsaturated carboxylic acid metal salt or salts are at least one compound selected from the group consisting of acrylic acid metal salts, methacrylic acid metal salts and maleic acid metal salts.

15. A rubber product obtainable by crosslinking the composition according to claim 12.

16. The rubber product according to claim 15 which is a rubber vibration insulator.

* * * * *